US008346584B2

(12) United States Patent
Suresh et al.

(10) Patent No.: US 8,346,584 B2
(45) Date of Patent: Jan. 1, 2013

(54) METHOD AND APPARATUS FOR DETERMINING DESIGN MODIFICATION EFFECTS ON A COMPUTERIZED ENGINEERING MODEL

(75) Inventors: Krishnan Suresh, Madison, WI (US); Sankara Hari Gopalakrishnan, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 971 days.

(21) Appl. No.: 12/022,552

(22) Filed: Jan. 30, 2008

(65) Prior Publication Data

US 2008/0183524 A1     Jul. 31, 2008

Related U.S. Application Data

(60) Provisional application No. 60/887,229, filed on Jan. 30, 2007, provisional application No. 61/024,029, filed on Jan. 28, 2008.

(51) Int. Cl.
*G06Q 40/00*     (2012.01)
(52) U.S. Cl. ...................... 705/7.11; 705/7.37
(58) Field of Classification Search ............. 705/8, 7.11, 705/7.37
See application file for complete search history.

(56) References Cited

U.S. PATENT DOCUMENTS

| | | | | |
|---|---|---|---|---|
| 7,451,062 B2* | 11/2008 | Srinivasan et al. | ............ | 702/182 |
| 7,525,545 B2* | 4/2009 | Brauss | ............ | 345/440 |
| 7,693,781 B2* | 4/2010 | Asher et al. | ............ | 705/37 |
| 7,711,628 B2* | 5/2010 | Davie et al. | ............ | 705/37 |
| 7,848,834 B2* | 12/2010 | Tecco et al. | ............ | 700/97 |
| 2002/0007348 A1* | 1/2002 | Ali et al. | ............ | 705/51 |
| 2003/0144868 A1* | 7/2003 | MacIntyre et al. | ............ | 705/1 |
| 2004/0111358 A1* | 6/2004 | Lange et al. | ............ | 705/37 |
| 2005/0160103 A1* | 7/2005 | Raffo | ............ | 707/100 |
| 2008/0183524 A1* | 7/2008 | Suresh et al. | ............ | 705/7 |

OTHER PUBLICATIONS

Kirsch, U., *Design-Oriented Analysis of Structures—Unified Approach*, Journal of Engineering Mechanics, 2003, pp. 264-272.
Terdalkar, S., *Graphically Driven Interactive Stress Reanalysis for Machine Elements in the Early Design Stage*, Aug. 2003, pp. 1-124.
Sokolowski, J., & Zochowski, A., *Optimality Conditions for Simultaneous Topology and Shape Optimization*, Siam J. Control Optim, 2003, vol. 42, No. 4, pp. 1198-1122, Society for Industrial and Applied Mathematics.
Tortorelli, D. & Wang, Z., *A Systematic Approach to Shape Sensitivity Analysis*, Int. J. Solids Structures, 1993, vol. 30, No. 9, pp. 1181-1212, Pergamon Press Ltd., Great Britain.
Feijóo, R., Novotny, A., & Taroco, E., *The Topological Derivative for the Poisson's Problem*, Mathematical Models and Methods in Applied Sciences, 2003, vol. 13, No. 12, pp. 1825-1844, World Scientific Publishing Company.
Garreau, S., Guillaume, P., & Masmoudi, M., *The Topological Asymptotic for PDE Systems: The Elasticity Case*, Mathematics Subject Classification, 1991, pp. 1-22.
Novotny, A., Feijóo, Taroco, E., & Padra, C., *Topological-Shape Sensitivity Analysis*, pp. 1-28.

(Continued)

*Primary Examiner* — Thomas Dixon
*Assistant Examiner* — Benjamin S Fields
(74) *Attorney, Agent, or Firm* — Boyle Fredrickson, S.C.

(57) ABSTRACT

An engineering simulation tool uses boundary regions of proposed design modifications to a finite design element to assess the impact of those proposed design modifications. This tool allows a designer to incorporate a new design feature into a proposed model and generate simulated performance results for the proposed design without re-execution of finite element method.

17 Claims, 5 Drawing Sheets

OTHER PUBLICATIONS

Novotny, A., Feijóo, R., Taroco, E., Padra, C., *Topological-Shape Sensitivity Method: Theory and Applications*, pp. 1-10.

Novotny, A., Feijóo, R., Taroco, E., & Padra, C., *Topological Sensitivity Analysis for Three-Dimensional Linear Elasticity Problem*, $6^{th}$ World Congress on Structural and Multidisciplinary Optiminzation, Rio de Janeiro, Brazil, May 30, 2005-Jun. 3, 2005, pp. 1-10.

Eschenauer, H. & Olhoff, N., *Topology Optimization of Continuum Structures: A Review*, ASME Appl. Mech. Rev., Jul. 2001, vol. 54, No. 4, pp. 331-390, American Society of Mechanical Engineers.

Sokolowski, J., & Zochowski, A., *On the Topolocial Derivative in Shape Optimization*, Siam J. Control Optim, 1999, vol. 37, No. 4, pp. 1251-1272, Society for Industrial and Applied Mathematics.

Giles, M. & Pierce, N., *An Introduction to the Adjoint Approach to Design*, Flow, Turbulence and Combusion, 2001, vol. 65, pp. 393-415, Kluwer Academic Publishers, Netherlands.

Giles, M. & Süli, E., *Adjoint Methods for PDEs: A Posteriori Error Analysis and Postprocessing by Duality*, Acta Numerica, 2002, pp. 145-236, Cambridge University Prerss, United Kingdom.

Sheffer, A., *Model Simplication for Meshing using Face Clustering*, pp. 1-16.

Oden, J. & Prudhomme, S., *Estimation of Modeling Error in Computational Mechanics*, Journal of Computational Physics, 2002, vol. 182, pp. 496-515, Elsevier Science, USA.

Foucault, G., Marin, P., & Léon, J., *Mechanical Criteria for the Preparation of Finite Element Models*.

Lee, Y. & Lee, K., *Geometric Detail Supression by the Fourier Transform*, Computer-Aided Design, 1998, vol. 30, No. 9, pp. 677-693, Elsevier, Ltd., Great Britain.

Lee, K, Price M., Armstrong, C., Larson, M., & Samuelsson, K., *CAD-to-CAE Integration Through Automated Model Simplication and Adaptive Modelling*, Chalmers Fifth Element Center, 2003, Sweden.

Gerstle, W., Jung, J., Witkowski, W., & Panthaki, M., *Use of Boundary Integral Method to Determine Local Characteristic Feature Size of Geometric Domains*, pp. 1-14.

Mobley, A., Carroll, M., Canann, S., *An Object Oriented Approach to Geometry Defeaturing for Finite Element Meshing*, pp. 1-17.

Shephard, M., Beall, M., & O'Bara, R., *Revisiting the Elimination of the Adverse Effects of Small Model Features in Automatically Generated Meshes*, pp. 13.

Lee, K., Armstrong, C., Price, M. & Lamont, J., *A Small Feature Spression/Unsupression System for Preparing B-Rep Models for Analysis*, 2005, Association for Computing Machinery, Inc., pp. 113-124.

Akgün, M., Garcelon, J., Haftka, R., *Fast Exact Linear and Non-Linear Structural Reanalysis and the Sherman-Morrison-Woodbury Formulas*, International Journal for Numerical Methods in Engineering, 2001, vol. 50, pp. 1587-1606.

Trevelyan, J., Scales, D., Morris, R., & Bird, G., *Acceleration of Boundary Element Computations in Reanalysis of Problems in Elasticity*, Computational Mechanics, 2004, pp. 1-9, Tsinghua University Press & Springer-Verlag.

Chen, S. & Yang, Z., *A Universal Method for Structural Static Reanalysis of Topological Modifications*, International Journal for Numerical Methods in Engineering, 2004, vol. 61, pp. 673-686, John Wiley & Sons, Ltd.

Kirsch, U. & Papalambros, P., *Structural Reanalysis for Topological Modifications—A Unified Approach*, pp. 15.

Chipperfield, K., Vance, J., & Fischer, A., *Fast Meshless Reanalysis Using Combined Approximations, Preconditioned Conjugate Gradient, and Taylor Series*, AIAA Journal, Jun. 2006, vol. 44, No. 6, pp. 1325-1331.

Nair, P., *Equivalence Between the Combined Approximations Technique and Krylov Subspace Methods*, AIAA Journal, vol. 40, No. 5, pp. 1021-1023.

Rayasam, M., Srinivasan, V., & Subbarayan, G., *CAD Inspired Hierarchical Partition of Unity Constructions for NURBS-Based, Meshless Design, Analysis and Optimization*, International Journal for Numerical Methods in Engineering, pp. 1-46.

\* cited by examiner

METHOD AND APPARATUS FOR DETERMINING DESIGN MODIFICATION EFFECTS ON A COMPUTERIZED ENGINEERING MODEL

CROSS-REFERENCE TO RELATED APPLICATION

This application claims the benefit of U.S. Ser. Nos. 60/887,229, filed Jan. 30, 2007, and 61/024,029, filed Jan. 28, 2008, the disclosures of which are incorporated herein by reference.

STATEMENT REGARDING FEDERALLY FUNDED RESEARCH

This invention was made with government support under 0322134 awarded by the National Science Foundation. The government has certain rights in the invention.

FIELD OF THE INVENTION

The present invention is directed to a method and apparatus for determining design modification effects on a computerized engineering model. Design modifications include the addition or removal of features, also known as "defeaturing", within an engineering model. In one implementation, the present invention provides an optimization tool for determining the impact or effect of a new design for a finite design element of a computerized model without requiring engineering analysis, such as finite element analysis, of the entire computerized model.

BACKGROUND OF THE INVENTION

Computer Aided Design (CAD) and computer aided engineering (CAE) tools allow engineers and designers to develop computerized models for various engineering solutions. These tools may be augmented with or include finite element analysis programs that perform simulations from which performance metrics of the computerized model may be measured, such as those related to stress, displacement, heat transfer, fluid dynamics, and electromagnetism.

Generally, a computerized model will include multiple individual finite design features or elements that are independently developed and then combined or meshed into a single composite model. While a function of the complexity of the model, it is not uncommon for a mesh to take several hours, if not, days to complete. Once the mesh is complete, finite element analysis may be performed to assess the behavior of the model. More particularly, the analysis process may measure various performance metrics, such as stress, displacement, thermal transfer, and the like. The performance metrics may then be analyzed to determine the performance of the simulated model to determine what, if any, design changes should be made to any of the various design features. Ultimately, this design and finite analysis process will be iteratively repeated to explore various design alternatives to optimize the design features to meet various design objectives, such as functionality, manufacturability, aesthetics, and the like.

A particularly challenging implication of such an iterative design process is that the designer must compute various quantities of interest, e.g., such as average stress within a region, maximum deflection, etc., as features and/or parameters are modified. This can be computationally intensive for complex geometry and field problems.

BRIEF DESCRIPTION OF THE INVENTION

The present inventors have designed an analytical tool, which can be implemented as software executed by a computer, that assesses the impact of a change in the design of a finite design element with reduced time and computational costs. The analytical tool is applicable with determining the impact of self-equilibrating features, i.e., those features having a localized impact, as well as non-self-equilibrating features, i.e., those features having a global impact. In general, the analytical tool provides feature-specific design sensitivity assessment by performing finite element analysis with a given finite element and then determining the impact any internal or boundary modifications to the finite element without iteratively repeating finite element analysis for the model with each design modification. In this regard, the present invention provides a tool for design exploration that is neither computationally nor time prohibitive.

For example, the present invention allows a designer interested in increasing the tip displacement within certain design constraints of a cantilever beam to explore multiple design configurations without requiring execution of the complete finite element method (constructing the geometry, creating a finite element mesh, assembling a stiffness matrix, and solving the resulting linear system, for each configuration). First, a conventional finite element analysis is performed on the base design, or the results therefrom accessed, to provide a value for a performance metric, such as elasticity in this example. In this elasticity example, the value of the performance metric represents the deformation ("primary") field associated with the base design. Next, or contemporaneously with the computation of the primary field, and at insubstantial computation and time cost, an adjoint field for the base configuration is derived. In this elasticity example, the adjoint field corresponds to the deformation field resulting from a unit load being placed on the cantilever. Now, the impact, with respect to tip displacement by the unit load, of a modification in the design of the beam can be derived; and, more importantly, without requiring execution of the complete finite element method. Specifically, boundary regions for a given modification, e.g., a hole formed in the body of the beam, are determined on a suitable coordinate grid and an expression characterizing tip displacement as a function of the primary and adjoint fields is solved to assess the impact of the design modification. More particularly, the expression is integrated over the boundary regions to provide a value (or range of values) for the performance metric, e.g., tip displacement. Thus, the impact of the design modification in terms of the performance metric can be quickly derived without requiring a separate finite element analysis of the design modification. In this regard, the present invention simplifies the assessment of design changes to boundary integral computation and thus effectively bypasses the need for repeated model preparation, meshing, and the like for design exploration.

The analytic tool may determine the impact of design modifications in response to user-identified design modifications, e.g., changes in shape or geometry of the design feature. Alternatively, the tool may automatically determine an optimized geometry for a given set of user-identified constraints. For example, the designer may design a base design and perform conventional finite element analysis to determine a value for a quantity of interest ("performance metric"). Rather than iteratively modifying the design, the user may identify a desired value for the performance metric given a set of design constraints. The analytic tool may then derive various possible modifications, perform the sensitivity analysis to assess the impact of each possible modification, and then output an optimized design modification given the constraints. Thus, in this embodiment, the tool, rather than the designer, performs the design exploration.

Accordingly, it is one object of the present invention to provide a tool available to designers and engineers to quickly and computationally efficiently assess the impact of design modifications to an engineering design.

It is another object of the present invention to provide an optimization tool that automatically determines an optimized design modification to a base design given a set of constraints.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION

The present invention is directed to a technique, and hardware/software/firmware for carrying out such a technique, in which the impact of a design change of a finite design element is determined without execution of the finite element method.

Figure 1:
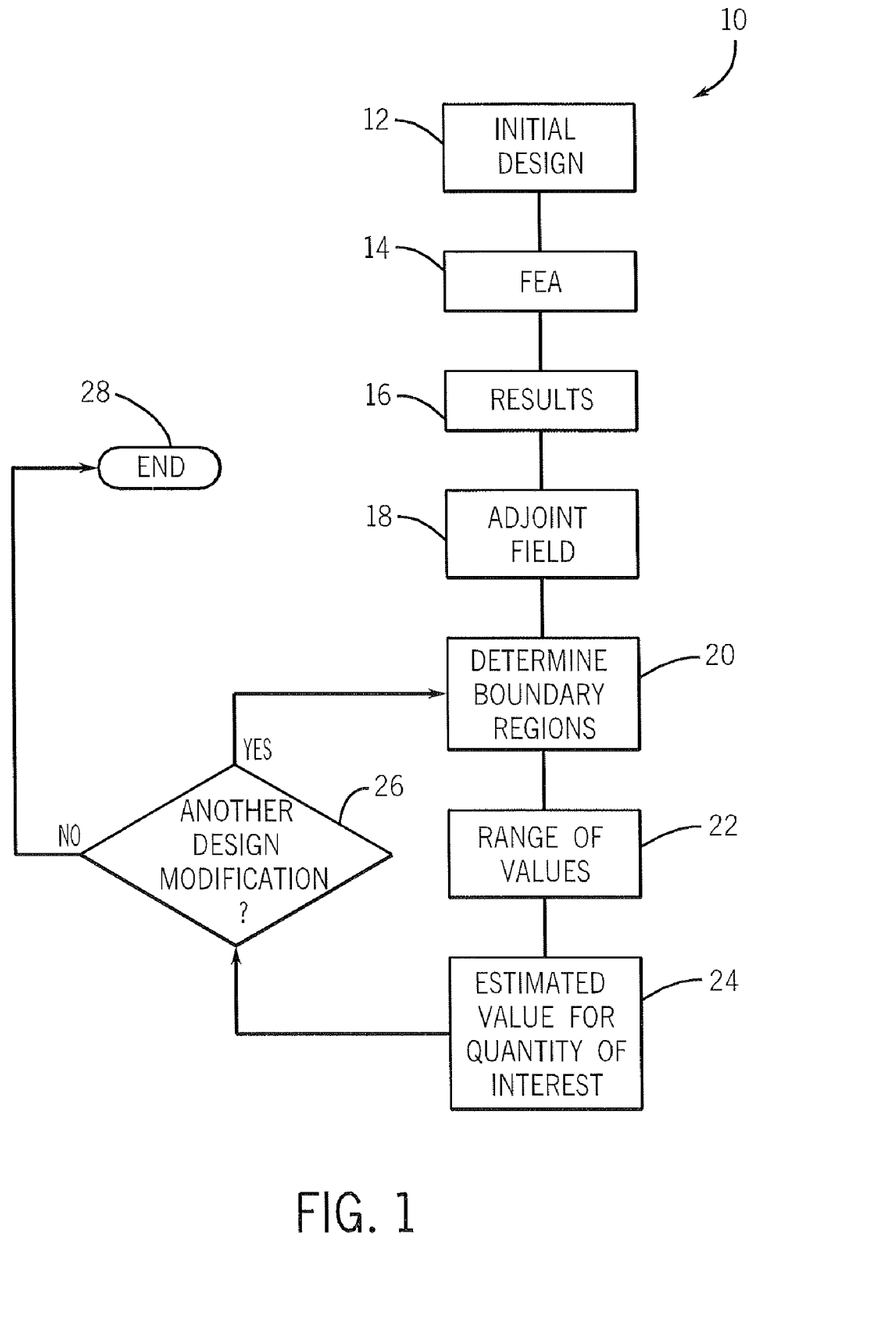
FIG. 1 is a flow chart setting for the steps of assessing the impact of a design change of a finite design element according to one aspect of the invention.

Referring now to FIG. 1, the design exploration process 10 begins with development, or otherwise accessing, an engineering design at block 12. A number of design and development tools, as known in the art, may be used to generate the initial design. Consistent with conventional finite element method, the initial design generated at block 10 is subjected to finite element analysis at block 14. As known in the art, finite element analysis is a computer simulation technique that uses numerical analysis to assess the performance of the design when subjected to various environmental factors. For example, finite element analysis may be performed for a dual device heat block design to assess the weighted temperature within a semiconductor device seated on the heat block when subjected to a given heat load. Thus, in this example, the weighted temperature represents a quantity of interest or performance metric that will be measured to assess performance of the proposed design. The results of the finite element analysis are output in a conventional manner, e.g., on a computer display, at block 16.

The present invention uses adjoint formulation theory to assess the impact of design changes independent of finite element analysis. In this regard, the adjoint field for the quantity of interest is determined at block 18. The adjoint field can be determined after the finite element analysis (block 14) or contemporaneously therewith. For purposes of description, the results of the finite element analysis for the quantity of interest will be referred to as the primary field, t(x,y), whereas the results of the adjoint formulation is the adjoint field, t*(x,y). The adjoint field is effectively a sensitivity map of the quantity of interest, e.g., weighted device temperature to the applied heat source.

Next, boundary regions for a proposed design change are determined at block 20. For example, for a hole incorporated into the proposed design, the position of the edges of the hole is determined. It is understood that the hole or other proposed design feature could be a 2D or a 3D object. An expression characterizing behavior of the modified design is then integrated for those boundary regions to determine a range of values for the quantity of interest. For example, for the weighted temperature of the semiconductor device seated on the heat block, a minimum weighted temperature value and a maximum weighted temperature value for the proposed modification, e.g., hole, is output at block 22. Alternately, or in addition, a specific estimated value, rather than a range of values, for the quantity of interest may be output at block 24. For some designs, a low or upper bound value may be sufficient to determine an optimal, or suitable, design modification whereas for other designs, a specific estimated value for the quantity of interest may be needed or otherwise desired.

The process 10 is designed to be repeated for each proposed design modification. Thus, at block 26, the process 10 determines if another proposed design modification needs to be evaluated. If so, the process 10 returns to block 20 whereupon the boundary regions for the new modification are determined. In this regard, the primary field and the adjoint field are not determined anew. Thus, the impact of the design modifications can be determined by simply evaluating the characterizing function at the new boundary regions. One skilled in the art will appreciate that this provides a significant time and computational savings relative to reexecution of the finite element analysis. If there are no additional design modifications, the process ends at block 28.

It is understood that the output of process 10 may include a range of expected values or a single estimated value for the performance metric to assist the designer in exploring design options. If a design modification is desired and made, finite element method may then be carried out for the new design. Thus, the benefits of the finite element method are utilized for new designs in which the modified design is first identified using the streamlined design exploration process described above.

It is appreciated that the computational efficiency of the present invention allows a designer to make real-time design modifications and assess the impact of each modification in real-time. That is, for the hole example referenced above, the designer could, using conventional graphical interfacing techniques such as a mouse or pointer, move the slot to various positions in the animated rendition of the heat block, and have the range of values (or specific estimated value) for the quantity of interest updated with each movement.

Figure 2:
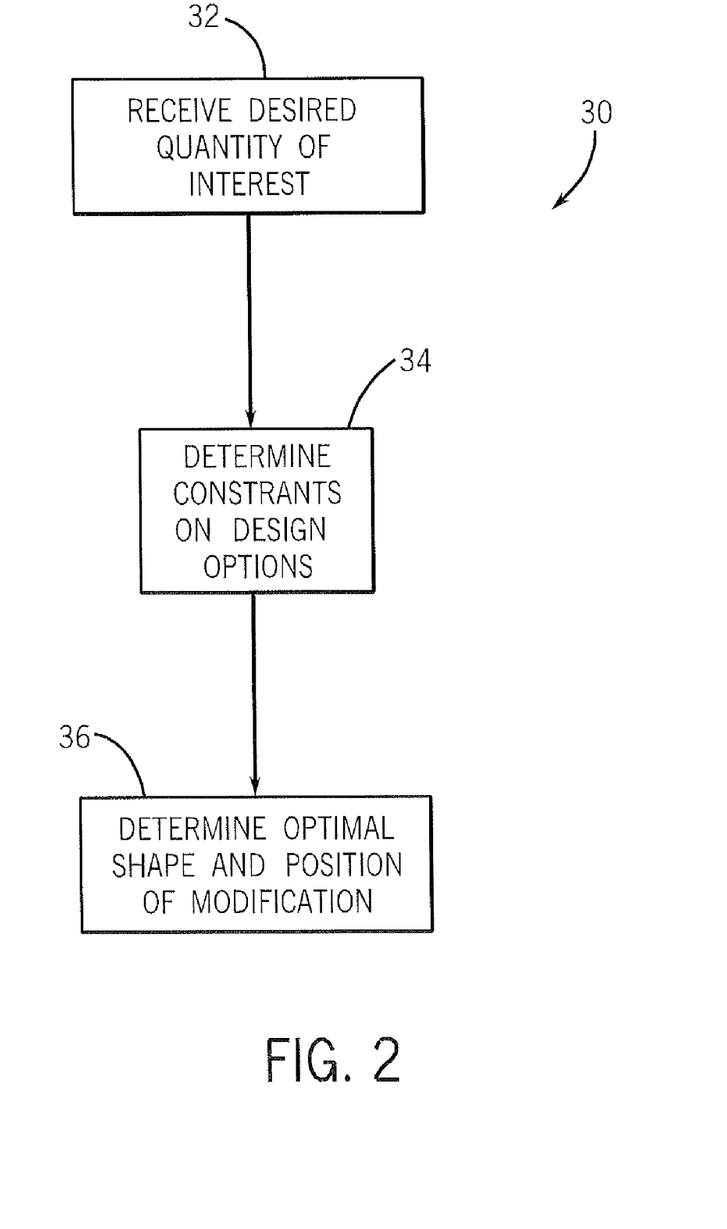
FIG. 2 is a flow chart setting forth the steps carried out by a computer to automatically determine an optimal design modification.

Conversely, as reflected in the process 30 set forth in the flow chart of FIG. 2, the computer could receive an input from the designer at block 32 indicative of a desired quantity of interest. From this desired quantity of interest and design constraints accessed at block 34, the computer may then automatically determine an optimal modification at block 36 using the primary and adjoint field information described above. More particularly, the computer could iteratively cycle through various design alternatives, find the quantity of interest for each alternative, and then determine which of the alternatives provides a best fit given the desired quantity of interest. It is appreciated that the designer may input parameters that place limitations of the type and/or location of a design modification. Similarly, the computer may access a database containing a library of possible design alternatives that are individually evaluated to determine the optimal modification.

Figure 3:
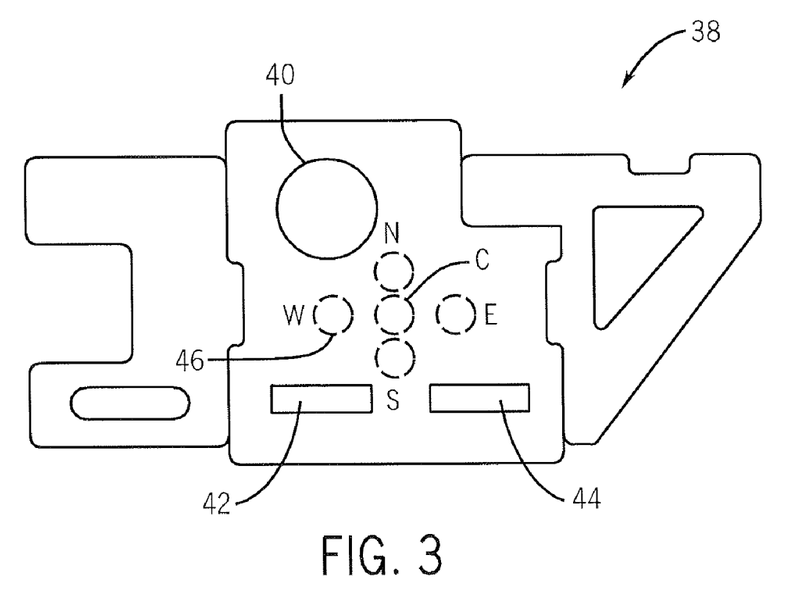
FIG. 3 is a schematic representation of a dual device heat block modifiable to include a hole at one of five possible locations (shown in phantom) to correct an imbalance in thermal load on a semiconductor device seated on the heat block.

A real-world example to which the present invention may be applied will be described with respect to FIGS. 3-4. FIG. 3 is a schematic diagram of a dual zone heat block 38 that receives heat from a heat source, e.g., coil, beneath the region identified at 40. A pair of semiconductor devices 42, 44 sits upon the heat block 38. In this illustrated example, the designer seeks to remedy the thermal load imbalance between the two semiconductor devices 42, 44. One skilled in the art will appreciate that device 42 will have higher average temperature than device 44 since it is positioned closer to the heat source beneath region 40.

As shown in FIG. 3, five possible locations for a hole 46 formed in the heat block to remedy the temperature imbalance are shown in phantom. In the illustrated example, the five locations include a center location (C), a north location (N), a south location (S), an east location (E), and a west location (W).

Figure 4:
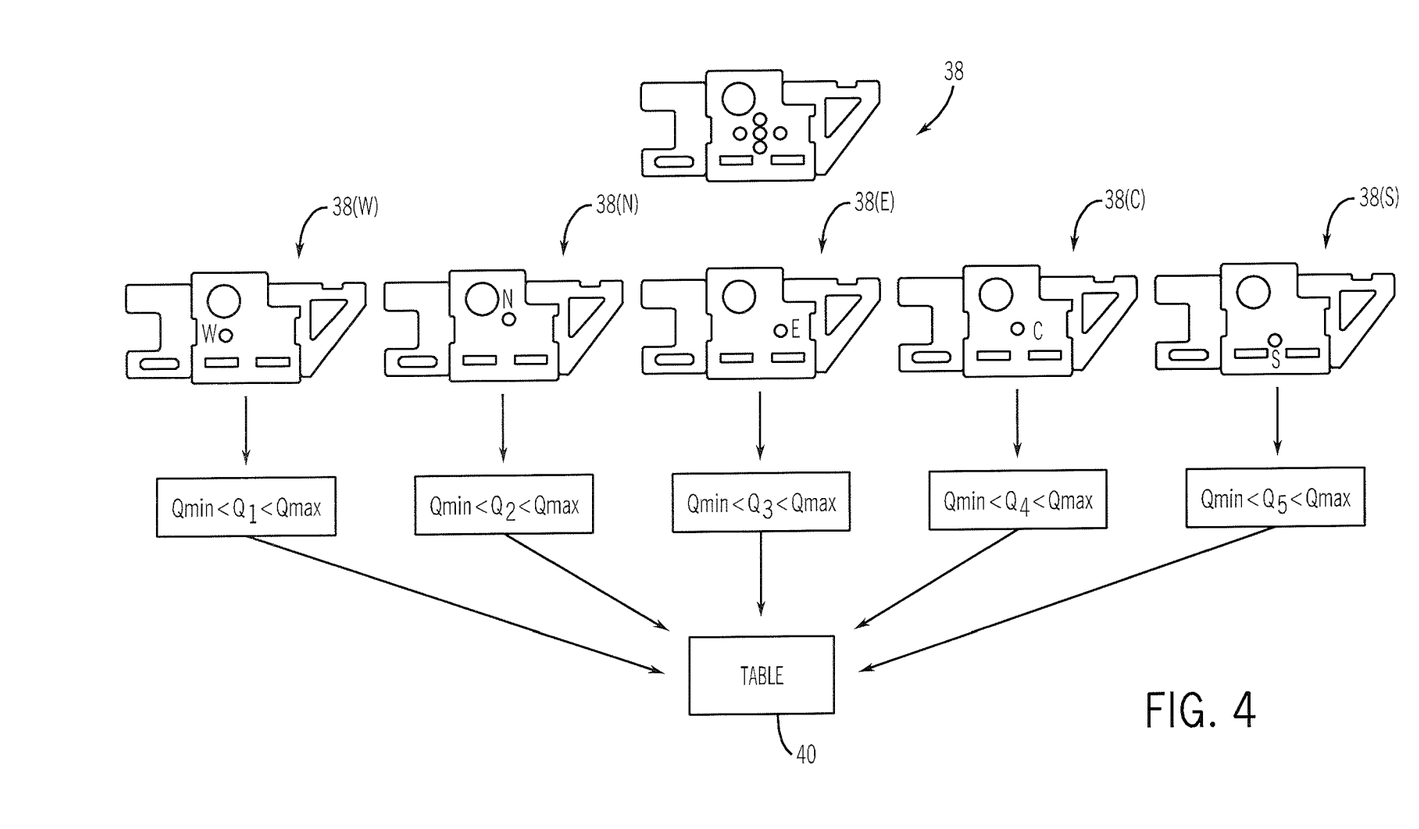
FIG. 4 is a process map for determining the optimal placement of the hole in the dual device heat block shown in FIG. 3 according to one aspect of the present invention.

Referring now to FIG. 4, for each of the five locations, the computer determines, from the boundary regions for each location, the value (or range of values) for the quantity of interest. More particularly, the computer determines the primary field and adjoint field arguments for the initial design of the heat block 38. The computer then determines the boundary correlations for each hole location, i.e., for heat blocks 38(W), 38(N), 38(E), 38(C), and 38(S). From those boundary regions, a range of values, i.e., an upper bound ($Q_{max}$) and a lower bound ($Q_{min}$) for the quantity of interest at each hole location are determined, and may be individually displayed on a computer monitor, or alternately, used to populate a table 40 that can be displayed on a computer monitor. The data of the table may be statistically evaluated to provide statistical values, such as mean values, to assist the designer in identifying the hole location that is optimal.

As noted above, the output may include either a range of values, i.e., an upper and lower bound for the quantity of interest for each location, or a specific estimated value for each location. This information may be output to a computer monitor and displayed in a human discernable form to the designer or used by the computer to automatically determine which location is the optimal location.

As described herein, the present invention integrates expressions characterizing a performance metric or quantity of interest as a function of primary and adjoint arguments for the boundary regions of a proposed design modification. For example, the expression that can be integrated to determine an upper and lower bound for each measurement is:

$$T_{device} \geq T_{device}^{lower} = t_{device} + \left\{ \frac{\int_{\Gamma_{slot}} t^*(-q - k\nabla t \cdot \hat{n})d\Gamma -}{g\sqrt{\int_{\Gamma_{slot}} (-k\nabla t^* \cdot \hat{n})^2 d\Gamma}} \right.$$

$$T_{device} \leq T_{device}^{upper} = t_{device} + \left\{ \frac{\int_{\Gamma_{slot}} t^*(-q - k\nabla t \cdot \hat{n})d\Gamma +}{g\sqrt{\int_{\Gamma_{slot}} (-k\nabla t^* \cdot \hat{n})^2 d\Gamma}} \right.,$$

where $t_{device}$ is the quantity of interest prior to design change, $T_{device}$ is the quantity of interest after design change, $\Gamma$ represents the boundary regions of the feature added to the base design, k is the thermal conductivity of the device, q is the heat generated internally, n is the normal to the boundary, and g captures a feature specific field. While the above expressions provide an upper and lower bound, a similar expression can be obtained for an estimate:

$$T_{device} \approx t_{device} + \int_{\Gamma_{slot}} (V \cdot n)(F_1 + F_2) ds$$

$$F_1 = \frac{(g + qt_0^* - k\{\nabla t + \nabla t_E\} \cdot \{\nabla t^* + \nabla t_E^*\})}{2}$$

$$F_2 = \frac{t_E \nabla_u g + qt_E^*}{3},$$

where in addition to the quantities defined for the equation above, $t_E$ is a feature specific field and V is an expression that depends on the location of the feature being added/deleted.

It is appreciated that other performance metrics will have different expressions and their derivations are believed to be well within the skill of one in the art.

Figure 5:
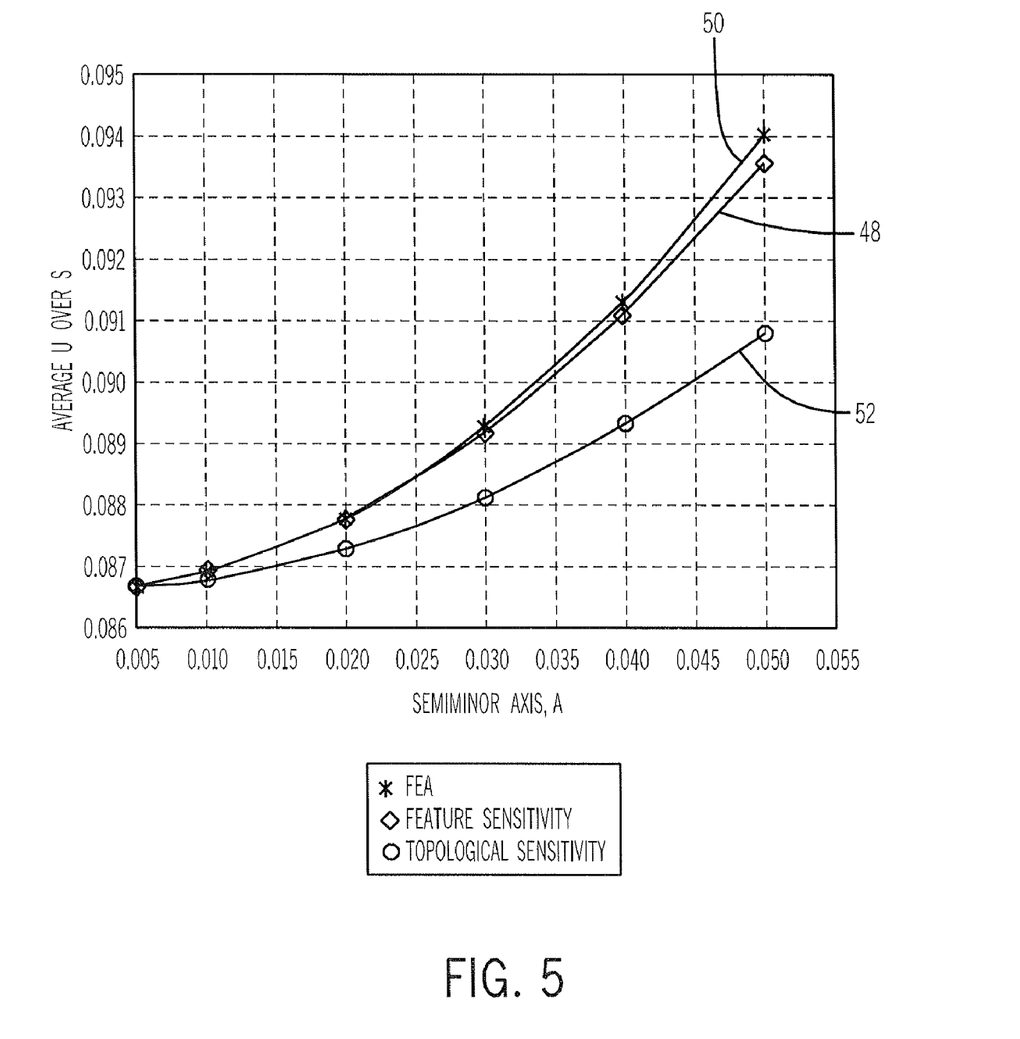
FIG. 5 is a graph comparing the results of design exploration according to the present invention with the results of two known design exploration techniques.

As described herein the present invention provides a tool that allows a designer to assess the impact of a design change to a computerized model without requiring finite element analysis of the modified computerized model. The tool streamlines the design exploration process by determining performance metrics for the finite element by integrating an expression characterizing the behavior of the model as a function of primary field and adjoint field arguments for the boundary regions of the proposed modification. The tool, depending upon the characterizing expression, may output a range of values indicating upper and lower bounds for the performance metric or, alternatively, provide an estimated value for the performance metric. As shown in the graphs of FIG. 5, the results of the feature sensitivity method of the present invention, identified by curve 48, are more consistent with the results of conventional finite element analysis, identified curve 50, than the topological sensitivity technique whose results are marked by curve 52. As the curves show, the present invention provides results substantially matched to those provided by conventional finite element analysis, yet avoids the time and computational burden associated with finite element analysis.

While the present application has been described with respect to assessing the impact of a design change to a computerized model that would otherwise be assessed using finite element analysis, it is understood that the present invention is also applicable with other types of engineering analyses such as boundary element analysis, meshless analysis, and the like.

Many changes and modifications could be made to the invention without departing from the spirit thereof. The scope of these changes will become apparent from the appended claims.

We claim:

1. A computerized system for evaluating design changes to a computerized model, comprising:
a computer programmed to:
conduct finite element analysis on a quantity of interest for a base design of the computerized model to determine a primary field;
derive an adjoint field for the quantity of interest of the base design;
accept an input for a design change of the computerized model from a user;
determine a performance metric of the design change for the computerized model as a function of the primary field and the adjoint field without finite element analysis of the computerized model as modified by the design change; and
output the performance metric to an electronic display;
wherein the performance metric is a range of values representing a lower bound for the performance metric and an upper bound for the performance metric based on the effect of the design change.

2. A computerized system for evaluating design changes to a computerized model, comprising:
a computer programmed to:
conduct finite element analysis on a quantity of interest for a base design of the computerized model to determine a primary field;
derive an adjoint field for the quantity of interest of the base design;
accept an input for a design change of the computerized model from a user;
determine a performance metric of the design change for the computerized model as a function of the primary field and the adjoint field without finite element analysis of the computerized model as modified by the design change;
output the performance metric to an electronic display; and
determine a value for the performance metric without a finite design feature and then determine the effect of the design change, wherein the design change includes the addition of the finite design feature to the computerized model.

3. The computerized system of claim 1 wherein the design change is for a self-equilibrating design feature of the computerized model.

4. The computerized system of claim 1 wherein the computer is further programmed to iteratively receive inputs for multiple differing design changes, determine an effect of each of the design changes in real-time, and output performance metrics for each design change to the electronic display in real-time.

5. The computerized system of claim 4 wherein the computer is further programmed to compare the performance metrics for the multiple design changes and automatically determine an optimal design change from the comparison.

6. A method embodied in a non-transitory computer-readable medium that when executed by a processor causes the processor to determine design modification effects on a computerized engineering model by:
defining a plurality of finite design features;
meshing the plurality of finite design features into a computerized model;
selecting a quantity of interest for the computerized model;
conducting finite element analysis on the quantity of interest for the computerized model to determine a primary field;
deriving an adjoint field for the quantity of interest for the computerized model;
redefining one of the finite design features; and
determining a performance metric for the redefined one of the finite design features as a function of the primary field and the adjoint field, the performance metric for the computerized model being independent of the computerized model;
wherein the performance metric is a range of values representing a lower bound for the performance metric and an upper bound for the performance metric based on the effect of the design change.

7. The method of claim 6 wherein the determining includes generating a range of values for the performance metric based on the redefined design feature.

8. The method of claim 7 further comprising presenting multiple redefinitions of the finite design feature, re-determining the performance metric for each redefinition, and selecting an optimized redefinition based on the range of values generated for each redefinition.

9. The method of claim 7 wherein the one finite design feature has a shape, size and location and wherein redefining the one finite design feature includes varying at least one of the shape, size and location of the one finite design feature.

10. The method of claim 7 further comprising incorporating the redefined finite design feature into the computerized model and then remeshing the computerized model.

11. The method of claim 6 further comprising iteratively redefining the one finite design feature and determining the performance metric for each iterative finite design feature.

12. The method of claim 11 further comprising comparing the performance metric from each iterative finite design feature and automatically determining an optimized finite design feature from the performance metrics.

13. A computer aided design tool having a computer programmed to execute a non-transitory computer-readable medium that causes the computer to:
assemble a plurality of design features into a computerized model and perform finite element analysis on a quantity of interest of the computerized model to determine a primary field;
derive an adjoint field for the quantity of interest of the computerized model;
redefining one of the design features;
determining a performance metric for the redefined one of the design features as a function of the primary field and the adjoint field;
determine an expected value for the performance metric;
iteratively redefine the one of the design features of the computerized model;
determine values for the performance metric for each redefined design feature without performing finite element analysis on the computerized model; and
determine an optimized modification of the design feature from the values for the performance metric;
wherein the performance metric is a range of values representing a lower bound for the performance metric and an upper bound for the performance metric based on the effect of the redefined design feature.

14. The computer aided design tool of claim 13 wherein the computer is further programmed to display the values for the performance metric associated with the iterative redefinitions of the design feature in real-time on a computer monitor.

15. The computer aided design tool of claim 14 wherein the computer is further programmed to determine, in real-time, a lower bound and an upper bound for the performance metric for each of the redefinitions of the design feature and display the bounds on the computer monitor.

16. The computer aided design tool of claim 15 wherein the computer is further programmed to determine, in real-time, a single estimated value for the performance metric for each of the redefinitions and display the single estimated values on the computer monitor.

17. The computerized system of claim 2 wherein the performance metric is a single estimated value.

* * * * *